United States Patent
Liu

(10) Patent No.: US 11,947,867 B2
(45) Date of Patent: Apr. 2, 2024

(54) SINGLE AUDIO INTERFACE SIGNAL SWITCHING CIRCUIT AND SINGLE AUDIO INTERFACE SWITCHING DEVICE

(71) Applicant: APUTURE IMAGING INDUSTRIES CO., LTD., Shenzhen (CN)

(72) Inventor: Qiankun Liu, Shenzhen (CN)

( * ) Notice: Subject to any disclaimer, the term of this patent is extended or adjusted under 35 U.S.C. 154(b) by 290 days.

(21) Appl. No.: 17/561,960

(22) Filed: Dec. 26, 2021

(65) Prior Publication Data

US 2022/0365742 A1    Nov. 17, 2022

(30) Foreign Application Priority Data

May 17, 2021   (CN) .......................... 202110533833.4

(51) Int. Cl.
  *G06F 3/16*    (2006.01)
  *H04B 1/401*   (2015.01)
  *H04B 1/44*    (2006.01)

(52) U.S. Cl.
  CPC .............. *G06F 3/165* (2013.01); *G06F 3/162* (2013.01); *H04B 1/401* (2013.01); *H04B 1/44* (2013.01)

(58) Field of Classification Search
  CPC .... H04B 1/44; H04B 2203/545; H04B 1/401; H04R 1/1041; H04R 2430/01; H04R 5/04; H04R 2420/09; H04R 3/12; H04R 29/001; H04R 2420/07; G06F 3/165; G06F 3/162
  USPC .......................................... 381/309, 355, 74
  See application file for complete search history.

(56) References Cited

U.S. PATENT DOCUMENTS

| | | | |
|---|---|---|---|
| 2018/0247627 A1 | 8/2018 | Fernandez | |
| 2018/0329671 A1 | 11/2018 | Einziger et al. | |
| 2019/0373294 A1 | 12/2019 | Bleidt et al. | |

FOREIGN PATENT DOCUMENTS

| | | |
|---|---|---|
| CN | 104883222 A | 9/2015 |
| CN | 107682588 A | 2/2018 |
| CN | 208399986 U | 1/2019 |
| CN | 111432259 A | 7/2020 |
| CN | 111586510 A | 8/2020 |
| WO | 2021203647 A1 | 10/2021 |

OTHER PUBLICATIONS

The First Office Action dated Jun. 30, 2021, for Aputure Imaging Industries Co., Ltd., from China Application No. 202110533833.4 and Its Translation of Office Action Into English (8 pages).
The Notice of Allowance and Search Report dated Sep. 3, 2021, for Aputure Imaging Industries Co., Ltd., from China Application No. 202110533833.4 and Its Translation of Notice of Allowance Into English (2 pages).

*Primary Examiner* — Kharye Pope

(57) ABSTRACT

A single audio interface signal switching circuit and a single audio interface switching device are provided by the embodiments of the present disclosure, which sets only one single audio interface and uses a working mode switching module to control a driver chip to generate different drive signals, in order to control working states of an audio signal output module, a time code input module, and a time code output module electrically connected with the driver chip. Since there is only one audio interface, and a working mode of the single audio interface switching device is controlled by the working mode switching module, so that a volume of the single audio interface switching device is reduced.

20 Claims, 8 Drawing Sheets

SINGLE AUDIO INTERFACE SIGNAL SWITCHING CIRCUIT AND SINGLE AUDIO INTERFACE SWITCHING DEVICE

CROSS REFERENCE TO RELATED APPLICATION

This application claims priority of Chinese Application No. 202110533833.4 filed on May 17, 2021, title of which is "SINGLE AUDIO INTERFACE SIGNAL SWITCHING CIRCUIT AND SINGLE AUDIO INTERFACE SWITCHING DEVICE", the entire disclosure of which is incorporated by reference in this application.

FIELD OF INVENTION

The present disclosure relates to a field of audio playback technology, and more particularly, to a single audio interface signal switching circuit and a single audio interface switching device.

BACKGROUND OF INVENTION

Basic functions such as audio monitoring, time code information synchronization, etc. are often required in a creation process of film and television dramas, variety shows, interviews, etc. As it involves audio monitoring, time code input, time code output, and other functions, a current general method for common equipment is to place two or more audio interfaces on the equipment to control audio monitoring and time input/output branch. Due to relatively large volume of audio receptacle, placement of multiple audio receptacles needs to be considered in product design, which poses a higher challenge for function-intensive products.

However, audio devices in the prior art typically include a plurality of audio interfaces to implement different functions, are thus relatively large in size and cannot be miniaturized.

SUMMARY OF INVENTION

Embodiments of the present disclosure provide a single audio interface signal switching circuit, which sets only an audio interface to solve a problem that volume of the prior art multi-audio interface cannot be miniaturized.

In the first aspect, an embodiment of the present disclosure provides a single audio interface signal switching circuit, the circuit including:
a single audio receptacle;
an audio signal output module, one end of the audio signal output module electrically connected to the single audio receptacle;
a time code input module, one end of the time code input module electrically connected to the single audio receptacle;
a time code output module, one end of the time code output module electrically connected to the single audio receptacle;
a driver chip, the driver chip including a plurality of pins, wherein another ends of the audio signal output module, the time code input module, and the time code output module are respectively electrically connected with each different pin of the driver chip; and
a working mode switching module, the working mode switching module electrically connected to one pin of the driver chip;

wherein the working mode switching module is used to control the driver chip to generate a drive signal to control working states of the audio signal output module, the time code input module, and the time code output module.

Further, the single audio receptacle includes multiple sets of switches, the multiple sets of switches correspond to multiple audio receptacle pins, the multiple audio receptacle pins are electrically connected to the audio signal output module, the time code input module, and the time code output module, respectively.

Further, the audio signal output module comprises a first analog switch (U1) and a second analog switch (U2), wherein the first analog switch (U1) and the second analog switch (U2) are electrically connected, and the circuit structures of the first analog switch (U1) and the second analog switch (U2) are same.

Further, both the first analog switch (U1) and the second analog switch (U2) include a pin A, a pin B1, and a pin B0; the pin A, the pin B1, and the pin B0 form a single-pole double-throw switch; the pin A in the first analog switch (U1) is electrically connected to an audio receptacle pin in the single audio receptacle, and corresponds to a left channel (L) in the single audio receptacle; and the pin A in the second analog switch (U2) is electrically connected to the audio receptacle pin in the single audio receptacle, and corresponds to a right channel (R) in the single audio receptacle.

Further, the circuit further includes an audio codec module, which includes a pin 1 and a pin 2, wherein the audio codec module is electrically connected to the first analog switch (U1) via the pin 1 and the audio codec module is electrically connected to the second analog switch (U2) via the pin 2.

Further, the time code input module includes a third analog switch (U3), the third analog switch (U3) comprises a pin A, the third analog switch (U3) is electrically connected to the driver chip though the pin A.

Further, the time code output module comprises a fourth analog switch (U4), the circuit structures of the fourth analog switch (U4) and the third analog switch (U3) are same; the fourth analog switch (U4) comprises a pin A, and the fourth analog switch (U4) is electrically connected with the driver chip through the pin A.

Further, the driver chip includes a pin EN1, a pin EN2, a pin EN3, and a pin EN4, the audio signal output module is electrically connected with the driver chip through the pin EN1 and the pin EN2, the time code input module is electrically connected with the driver chip through the pin EN3, and the time code output module is electrically connected with the driver chip through the pin EN4.

Further, the driver chip further includes a pin DET, the single audio receptacle is electrically connected to the pin DET to detect whether an earphone is inserted.

Further, the working mode switching module includes a plurality of switch buttons for controlling level signals output by the pin EN1, the pin EN2, the pin EN3, and the pin EN4.

In a second aspect, an embodiment of the present disclosure further provides a single audio interface switching device, the single audio interface switching device includes the single audio interface signal switching circuit as described in any one of the above.

Further, the single audio receptacle includes multiple sets of switches, the multiple sets of switches correspond to multiple audio receptacle pins, the multiple audio receptacle pins are respectively electrically connected to the audio signal output module, the time code input module, and the time code output module.

The single audio interface signal switching circuit and the single audio interface switching device provided by the embodiments of the present disclosure sets only one single audio interface, and uses the working mode switching module to control the driver chip to generate different drive signals, in order to control the working states of the audio signal output module, the time code input module and the time code output module electrically connected with the driver chip. Since there is only one audio interface, the working mode of the single audio interface switching device is controlled by the working mode switching module, so that the volume of the single audio interface switching device is reduced.

DESCRIPTION OF DRAWINGS

The accompanying figures to be used in the description of embodiments of the present disclosure will be described in brief to more clearly illustrate the technical solutions of the embodiments. It is obvious that the accompanying figures described below are only part of the embodiments of the present disclosure, from which figures those skilled in the art can derive further figures without making any inventive efforts.

DETAILED DESCRIPTION OF PREFERRED EMBODIMENTS

Figure 1:
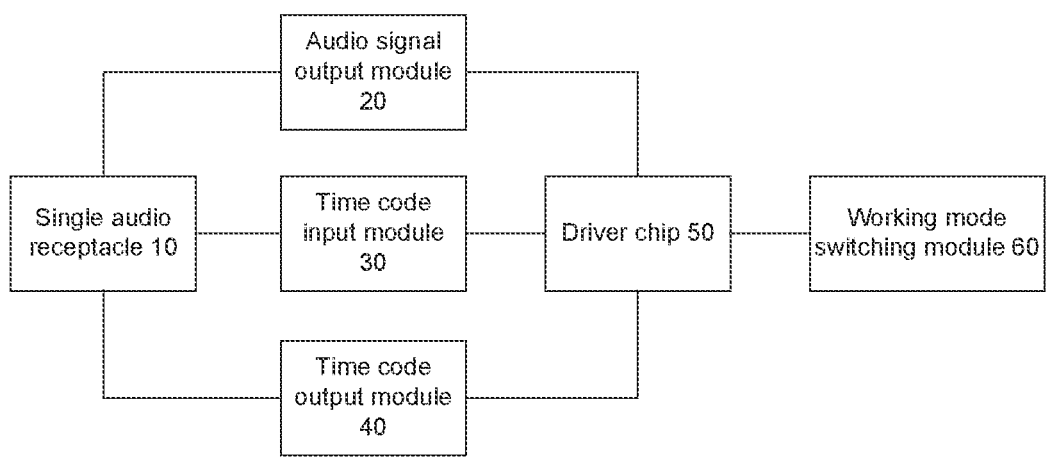
FIG. 1 is a simplified schematic diagram of a single audio interface signal switching circuit according to an embodiment of the present disclosure.

The technical solutions in the embodiments of the present disclosure will be clearly and completely described below with reference to the accompanying figures in the embodiments of the present disclosure. It is obvious that the described embodiments are only a part of the embodiments of the present disclosure, and not all of the embodiments. All other embodiments, which can be obtained by those skilled in the art based on the embodiments in the present disclosure without creative work, shall fall within the scope of the present disclosure.

In the description of the present disclosure, it should be understood that orientations or position relationships indicated by terms such as "center", "longitudinal", "lateral", "length", "width", "thickness", "upper", "lower", "front", "rear", "left", "right", "vertical", "horizontal", "top", "bottom", "inner", "outer", and the like are based on the orientation or position shown by the accompanying figures, and are only for convenience of describing the present disclosure and simplifying the description, rather than indicating or implying that the device or element being referred to must have a particular orientation or position, or be constructed or operated in a particular orientation or position, and thus should not be construed as limiting the present disclosure. Furthermore, the terms "first", "second" are used for the purpose of describing only and are not to be construed as indicating or implying relative importance or implicitly indicating the number of technical features indicated. Thus, features defined as "first", "second", may explicitly or implicitly include one or more of the described features. In the description of the present disclosure, "a plurality of" or "multiple" means two or more unless otherwise specifically defined.

In the present disclosure, the term "exemplary" is used to represent "serving as an example, illustration or description." Any embodiment described as "exemplary" in the present disclosure is not necessarily construed to be more preferable or more advantageous than other embodiments. In order to enable any person skilled in the art to implement and use the present disclosure, the following description is given. In the following description, the details are listed for the purpose of explanation. It should be understood that those of ordinary skill in the art will realize that the present disclosure can also be implemented without using these specific details. In other embodiments, well-known structures and processes will not be described in detail to avoid unnecessary details to obscure the description of the present disclosure. Therefore, the present disclosure is not intended to be limited to the embodiments shown, but is to be accorded the widest scope consistent with the principles and features disclosed in the present disclosure.

The embodiment of the present disclosure provides a single audio interface signal switching circuit and a single audio interface switching device. Detailed descriptions are given below.

The single audio interface signal switching circuit provided by the embodiment of the present disclosure may include:

a single audio receptacle;

an audio signal output module, one end of the audio signal output module electrically connected to the single audio receptacle;

a time code input module, one end of the time code input module electrically connected to the single audio receptacle;

a time code output module, one end of the time code output module electrically connected to the single audio receptacle;

a driver chip, the driver chip including a plurality of pins, wherein another ends of the audio signal output module, the time code input module, and the time code output module are respectively electrically connected with each different pin of the driver chip; and a working mode switching module, the working mode switching module electrically connected to one pin of the driver chip;

wherein, the working mode switching module is used to control the driver chip to generate a drive signal to control working states of the audio signal output module, the time code input module, and the time code output module.

The single audio interface signal switching circuit provided by the embodiments of the present disclosure sets only one single audio interface and uses the working mode switching module to control the driver chip to generate different drive signals, in order to control working states of the audio signal output module, the time code input module, and the time code output module electrically connected with the driver chip. Since there is only one audio interface, the working mode of the single audio interface switching device is controlled by the working mode switching module, so that a volume of the single audio interface switching device is reduced.

FIG. 1 is a simplified schematic diagram of the single audio interface signal switching circuit according to an embodiment of the present disclosure. In FIG. 1, a single audio receptacle 10 is directly electrically connected with an audio signal output module 20 to realize output of audio signal; a time code input module 30 is also directly electrically connected to the single audio receptacle 10, and an externally generated time code signal can be input to the single audio device through the single audio receptacle 10, so as to be finally displayed on a display screen of the single audio device. At a same time, a time code output module 40 is also directly electrically connected to the single audio receptacle 10, and time code signal generated by the time code output module 40 is directly output to other equipment that can recognize time codes through the single audio receptacle 10.

In the above embodiment, the single audio interface signal switching circuit further includes a driver chip 50, and the driver chip 50 includes a plurality of different pins. And the audio signal output module 20, the time code input module 30, and the time code output module 40 are electrically connected to the driver chip directly through the pins on the driver chip 50. The driver chip 50 can be used to control working states of the audio signal output module 20, the time code input module 30, and the time code output module 40 so as to achieve different functions of the single audio interface switching device.

Meanwhile, in the embodiment of the present disclosure, the single audio interface signal switching circuit may also include a working mode switching module 60, the working mode switching module 60 is directly electrically connected with the driver chip through the plurality of pins on the driver chip 50. The working mode switching module 60 can control the driver chip 50 to generate different drive signals, and then use the driver chip to control the working states of the audio signal output module 20, the time code input module 30 and the time code output module 40.

It should be noted that the driver chip 50 includes the plurality of pins, and the driver chip 50 is electrically connected to other modules through the plurality of pins. Specifically, another end of the audio signal output module is electrically connected with one of the plurality of pins of the driver chip, another end of the time code input module is electrically connected with one of the plurality of pins of the driver chip, and another end of the time code input module is electrically connected with one of the plurality of pins of the driver chip. In the embodiment of the present disclosure, the pins of the driver chip 50 electrically connected to the audio signal output module 20, the time code input module 30, the time code output module 40, and the operating mode switching module 60 are different.

Figure 2:
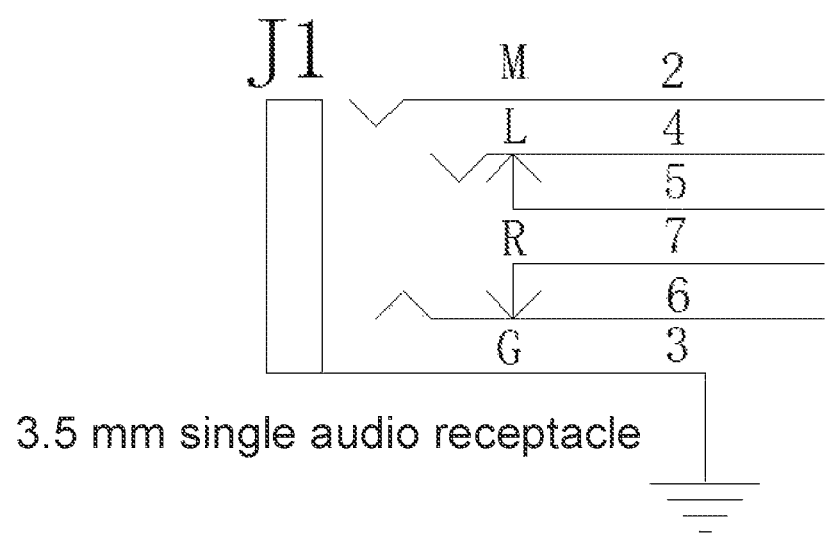
FIG. 2 is a schematic diagram of a single audio receptacle according to an embodiment of the present disclosure.

Please refer to FIG. 2, which is a schematic diagram of a single audio receptacle according to an embodiment of the present disclosure. In the embodiment shown in FIG. 2, the single audio receptacle 10 may include multiple sets of switches, the multiple sets of switches correspond to multiple audio receptacle pins, and the single audio receptacle 10 is electrically connected with the audio signal output module, the time code input module and the time code output module, respectively, through the multiple audio receptacle pins.

Specifically, in the embodiment shown in FIG. 2, the single audio receptacle 10 can include audio receptacle pins 2-7, wherein the audio receptacle pin 2 and the audio receptacle pin 3 are grounded, the audio receptacle pin 4 and the audio receptacle pin 5 constitute a set of mechanical normally-closed switches, corresponding to the left channel (L) of the single audio receptacle 10, and the audio receptacle pin 6 and the audio receptacle pin 7 also constitute a set of mechanical normally-closed switches, corresponding the right channel (R) of the signal audio receptacle.

Figure 3:
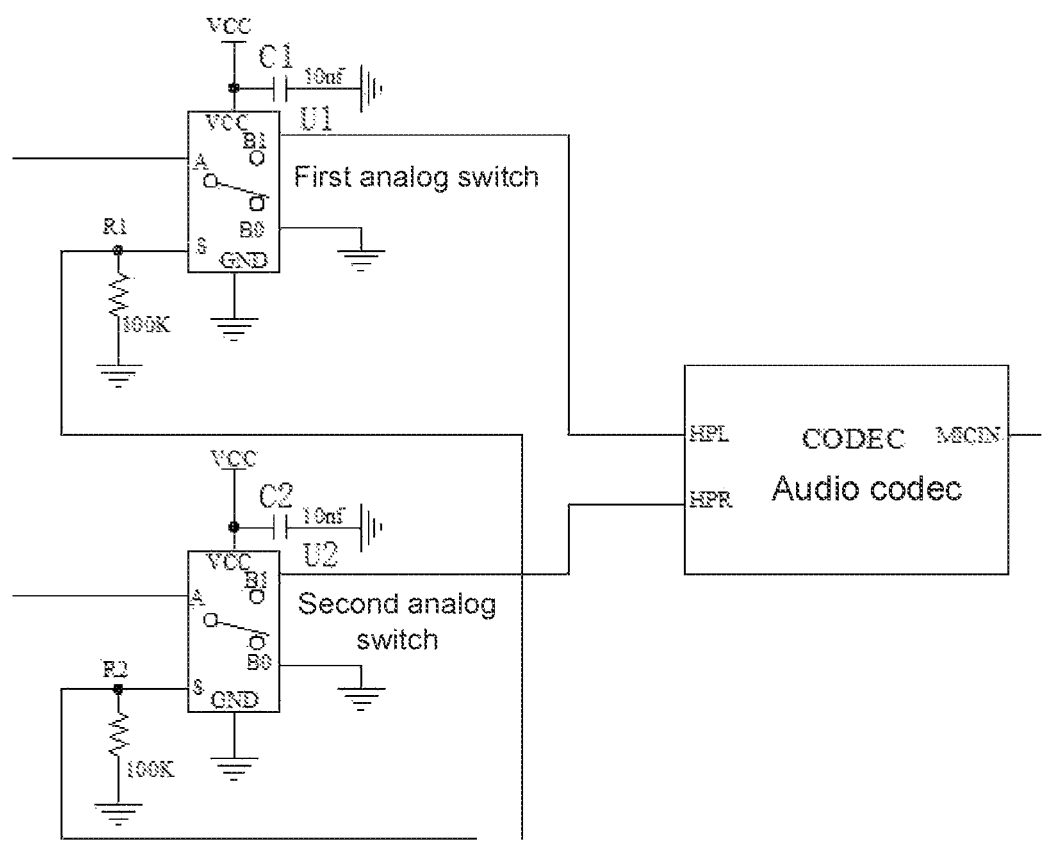
FIG. 3 is a schematic diagram of an audio signal output module according to an embodiment of the present disclosure.

Please refer to FIG. 3, which is a schematic diagram of an audio signal output module provided by an embodiment of the present disclosure. In the embodiment shown in FIG. 3, an audio signal output module 20 can include a first analog switch (U1) and a second analog switch (U2). In some embodiments of the present disclosure, circuit structures of the first analog switch (U1) and the second analog switch (U2) may be same.

In the embodiment shown in FIG. 3, the circuit structures of the first analog switch (U1) and the second analog switch (U2) are same, and both the first analog switch (U1) and the second analog switch (U2) include a pin S, and the audio signal output module 20 and the driver chip 50 are electrically connected though the pin S. Both the first analog switch (U1) and the second analog switch (U2) include a pin A, a pin B1, and a pin B0, the pin A, the pin B1, and the pin B0 form a single-pole double-throw switch. The pin A in the first analog switch (U1) is electrically connected to the audio receptacle pin 4 in the single audio receptacle 10 and corresponds to the left channel (L) in the single audio receptacle 10; and the pin A in the second analog switch (U2) is electrically connected to the audio receptacle pin 6 in the single audio receptacle 10 and corresponds to the right channel (R) in the single audio receptacle 10.

In the above embodiment, the single audio interface signal switching circuit may further include an audio codec (CODEC) 70, the audio codec 70 usually includes a left channel pin HPL and a right channel pin HPR, wherein, the pin HPL is electrically connected to the pin B1 in the first analog switch (U1), to provide the left audio signal, and the pin HPR is electrically connected to the pin B1 in the second analog switch (U2). The audio signal generated by the audio codec 70 can be output by the audio signal output module 20. Specifically, the first analog switch (U1) and the second analog switch (U2) in the audio signal output module 20 can be switched to realize electrical connection with the pins of the single audio receptacle 10, thereby realizing conduction of audio wires from the audio codec 70 through the audio signal output module 20 to the single audio receptacle 10 to achieve output of the audio signal.

Figure 4:
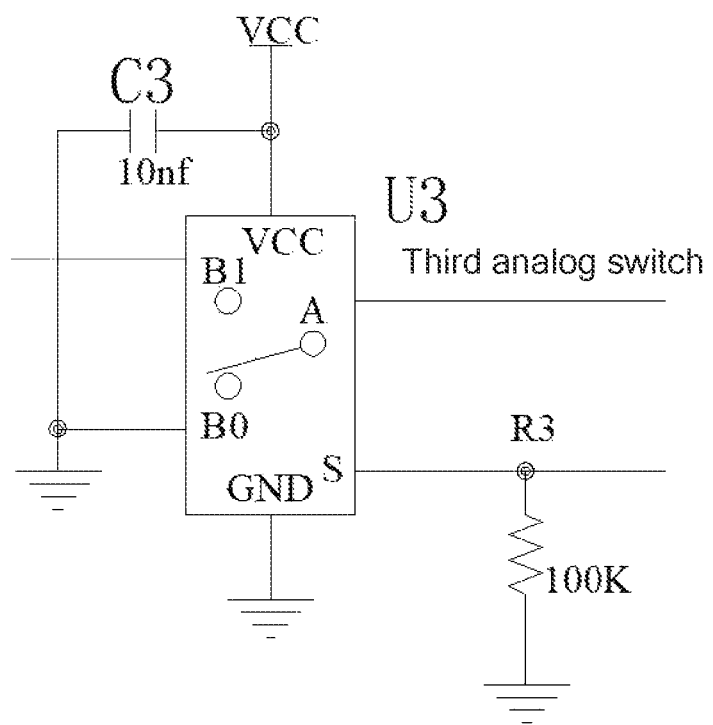
FIG. 4 is a schematic diagram of a time code input module according to an embodiment of the present disclosure.

Please refer to FIG. 4, which is a schematic diagram of a time code input module provided by an embodiment of the present disclosure. In FIG. 4, the time code input module 30 can include a third analog switch (U3), and in the embodiment of the present disclosure, a circuit structure of the third analog switch (U3) is same as that the circuit structure of the first analog switch (U1), therefore, the third analog switch (U3) also includes a pin A, a pin S, a pin B1, and a pin B0. The third analog switch (U3) is electrically connected to the driver chip 50 through the pin A, i.e., the time code input module 30 is electrically connected to the driver chip 50 through the pin A of the third simulation switch (U3).

At a same time, the pins B0 of the first analog switch (U1), the second analog switch (U2), and the third analog switch (U3) are electrically connected to ground. And different from the first analog switch (U1) and the second analog switch (U2), the third analog switch (U3) is electrically connected to the driver chip 50 through the pin A and the pin S, while the first simulation switch (U1) and the second analog switch (U2) is electrically connected to the driver chip 50 by only the pin S.

Figure 5:
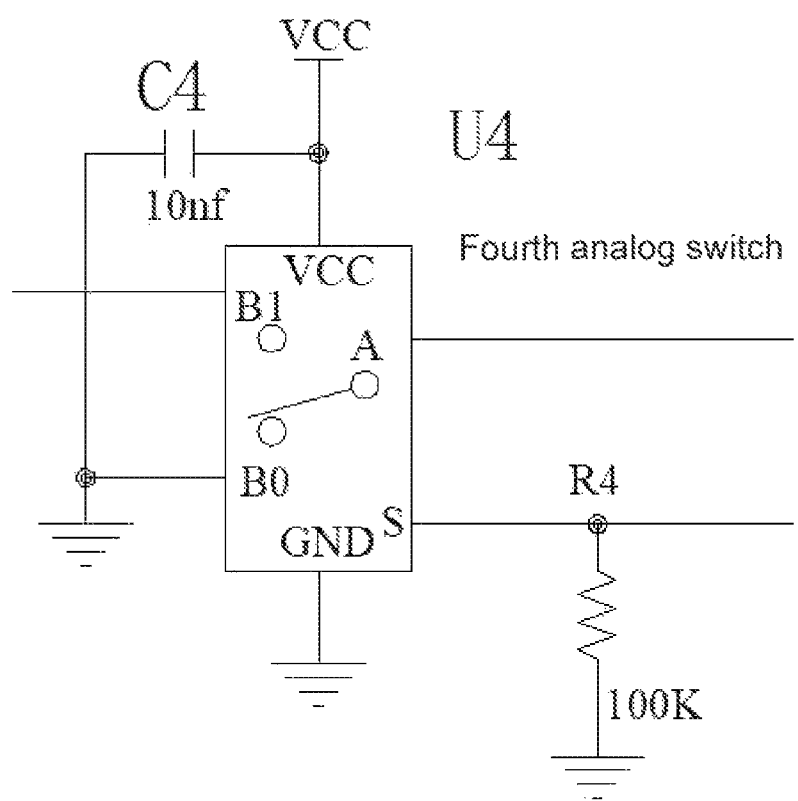
FIG. 5 is a schematic diagram of a time code output module according to an embodiment of the present disclosure.

Please refer to FIG. 5, which is a schematic diagram of a time code output module according to an embodiment of the present disclosure. In FIG. 5, the time code output module 40 includes a fourth analog switch (U4), and the fourth analog switch (U4) may have a same circuit structures as the third analog switch (U3). That is, the fourth analog switch (U4) also includes a pin A, and the fourth analog switch (U4) is also electrically connected to the driver chip 50 through the pin A and a pin S. Meanwhile, the fourth analog switch (U4) also includes the pin S, a pin B1, and a pin B0; and the pin B0 in the fourth analog switch (U4) is grounded; the fourth analog switch (U4) is electrically connected to the single audio receptacle 10 via the pin B1.

Figure 6:
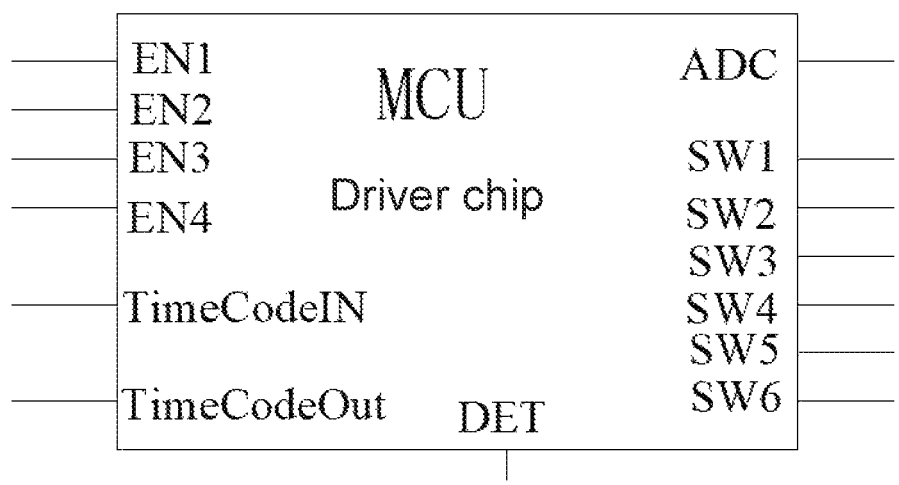
FIG. 6 is a schematic diagram of a driver chip according to an embodiment of the present disclosure.

Please refer to FIG. 6, which is a schematic diagram of a driver chip according to an embodiment of the present disclosure. In FIG. 6, the driver chip 50 can include a plurality of pins. Specifically, the driver chip 50 can include a pin EN1, a pin EN2, a pin EN3, and a pin EN4. The pin S in the first analog switch (U1) in the audio signal output module 20 is electrically connected to the pin EN1 in the driver chip 50, the pin S in the second analog switch (U2) in the audio signal output module 20 is electrically connected to the pin EN2 in the driver chip 50, the third analog switch (U3) in the time code input module 30 is electrically connected to the pin EN3 in the driver chip 50 through the pin S, and the fourth analog switch (U4) in the time code output module 40 is electrically connected to the pin EN4 in the driver chip through the pin S.

In the above embodiments, the driver chip 50 can further include a time code input interface TimeCode IN and a time code output interface TimeCode OUT. The time code input interface TimeCode IN is electrically connected to the pin A of the third analog switch (U3) in the time code input module 30, while the time code output interface TimeCode OUT is electrically connected to the pin A of the fourth analog switch (U4) in the time code output module 40.

Figure 7:
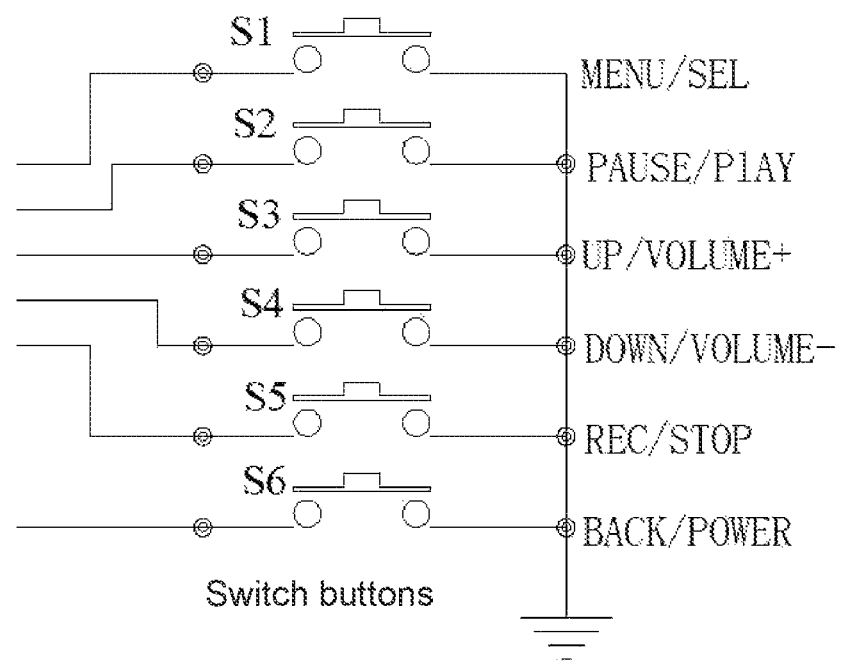
FIG. 7 is a schematic diagram of a working mode switching module according to an embodiment of the present disclosure.

Please refer to FIG. 7, which is a schematic diagram of a working mode switching module according to an embodiment of the present disclosure. In FIG. 7, the working mode switching module 60 can include a plurality of switch buttons, which are mainly used for controlling level signals output by the pin EN1, the pin EN2, the pin EN3, and the pin EN4 in the driver chip 50.

In the above embodiments, in addition to the pin EN1, pin EN2, pin EN3, pin EN4, the time code input interface TimeCode IN and the time code output interface TimeCode OUT, the driver chip 50 can also include pins SW1-SW6, while the working mode switching module 60 can also include switch buttons S1-S6, wherein one switch button corresponds to one pin SW.

In the embodiments of the present disclosure, magnitude of the level signals corresponding to different pins in the driver chip 50 can be controlled by the plurality of switch buttons in the working mode switching module 60 to switch the working mode of the single audio interface switching device.

In a specific embodiment of the present disclosure, the switch buttons of the working mode switching module are respectively S1, S2, S3, S4, S5, and S6. Among them, the switch button S1 is a menu button (MENU/SEL), the switch button S2 is a pause/start button (PAUSE/PLAY), the switch button S3 is a volume increase button (UP/VOLUME+), the switch button S4 is a volume reduction button (DOWN/VOLUME−), the switch button S5 is a recording button (REC/STOP), and the switch button S6 is a power button (BACK/POWER).

Figure 8:
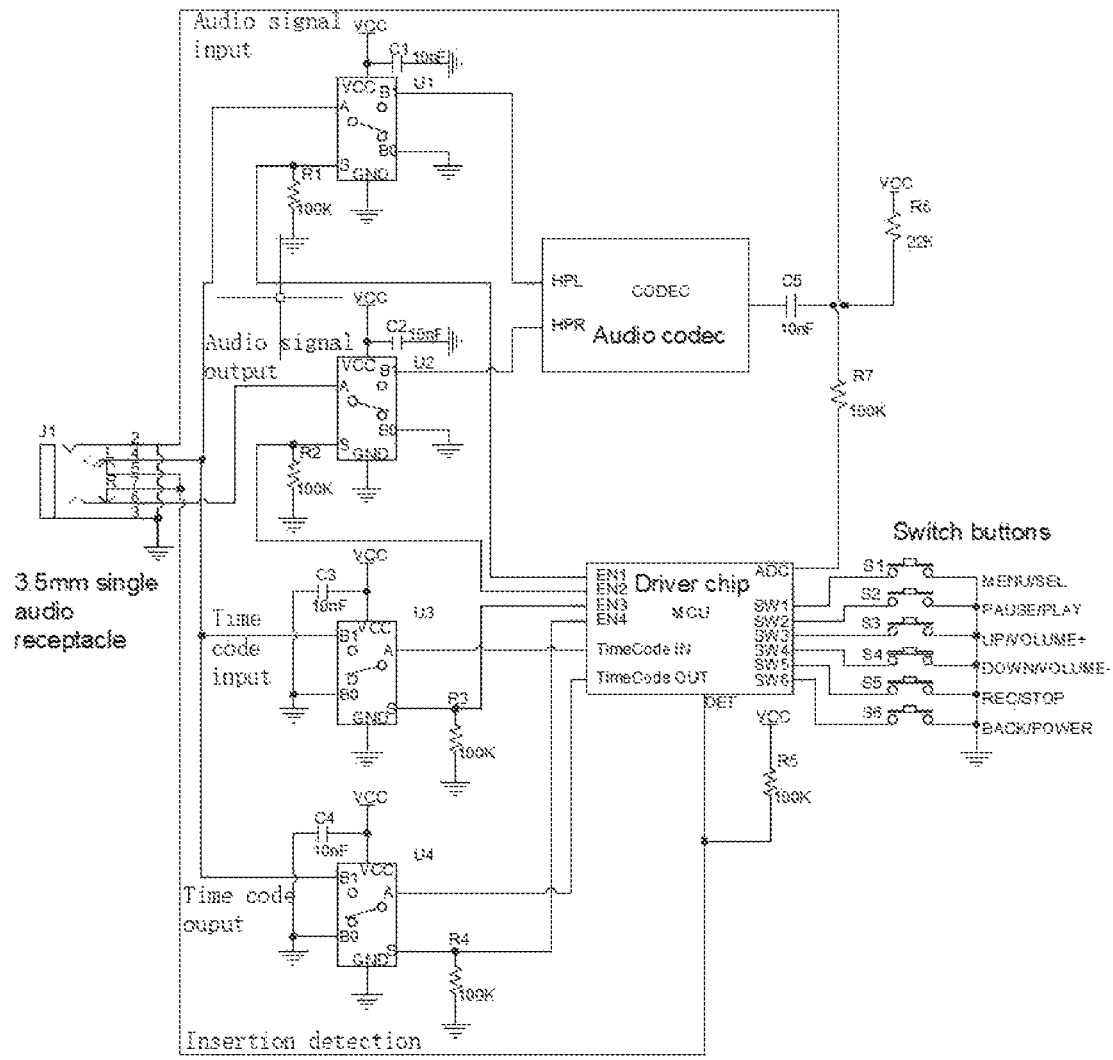
FIG. 8 is a schematic diagram of a single audio interface signal switching circuit according to an embodiment of the present disclosure.

FIG. 8 is a schematic diagram of a single audio interface signal switching circuit according to an embodiment of the present disclosure. In the embodiment shown in FIG. 8, switch button S6 is long pressed to start the single audio interface switching device. During a startup process of the single audio interface switching device, the driver chip 50 sends low-level signals to the pin EN1, pin EN2, pin EN3 and pin EN4. Since the pin EN1 is electrically connected to the pin S of the first analog switch (U1) by a wire, the pin EN2 is electrically connected to the pin S of the second analog switch (U2) by a wire, the pin EN3 is electrically connected to the third analog switch (U3) by a wire, and the pin EN4 is electrically connected to the fourth analog switch (U4) by a wire, so that when the pins S in the analog switches receive the low-level signals, the pins A and the pins B0 of the analog switches are electrically connected to each other.

In addition, as the pins B0 of the first analog switch (U1), the second analog switch (U2), the third analog switch (U3), and the fourth analog switch (U4) is electrically connected with the ground, the pins A of the first analog switch (U1), the second analog switch (U2), the third analog switch (U3) and the fourth analog switch (U4) are electrically connected to the ground through the pins B0. Four paths respectively between the pin A and the pin B1 in the first analog switch (U1), between the pin A and the pin B1 in the second analog switch (U2), between the pin A and the pin B1 in the third analog switch (U3), and between the pin A and the pin B1 in the fourth analog switch (U4), are all disconnected, and audio signal output, time code input, and time code output are not performed.

In FIG. 8, the driver chip 50 further includes a pin DET, and the pins 5 and 7 of the single audio receptacle 10 are electrically connected to the pin DET of the driver chip 50 through wires to detect whether an earphone is inserted. When the pin DET of the driver chip 50 is a low-level signal, the driver chip 50 detects that no device is inserted into the single audio interface switch device at this time and no operation is performed to realize a state corresponding to mode 1 in which all signals are not output.

In the above embodiments, an earphone is inserted when the single audio interface switching device is in a power-on state, or the switch button S6 is long pressed to turn on the single audio interface switching device after inserting the earphone. Two sets of mechanical normally-closed switches, namely pins 4,6 and pins 5,7 in the single audio receptacle 10, become open after inserting the earphone. The pins 4 and 6 are no longer connected, so are the pins 5 and 7. The pins 5 and 7 of the single audio receptacle 10 are pulled to a high level by a resistor R5 and the pins 5 and 7 of the single audio receptacle 10 are connected to the pin DET in the driver chip 50 by a wire. At this time, the driver chip 50 detects that the pin DET is in a high level, and a corresponding earphone icon appears on the display screen. Meanwhile, the pins EN1 and EN2 in the driver chip 50 output high-level signals, so that both the pin S in the first analog switch (U1) and the pin S in the second analog switch (U2) reach high levels. The pin A and pin B1 in the first analog switch (U1) are switched to be electrically connected together, so are the pin A and pin B1 in the second analog switch (U2). At this time, the audio signal generated by the audio codec 70 is sent to the pin B1 of the first analog switch (U1) and the pin B1 of the second analog switch (U2) by wires, and to the pin of the single audio receptacle 10 by switching the first analog switch (U1) and the U2, for outputting the audio signal. The pins EN3 and EN4 in the driver chip 50 output low-level signals, and pins A and B0 of the third analog switch (U3) and the fourth analog switch (U4) are electrically connected to the ground, so that time code input and time code signal output are not performed to realize a state corresponding to mode 2 of audio signal output.

In the above embodiments, page turning operation can be performed on the display screen of the single audio interface switching device by clicking the buttons S1, S2, S3, S4, S5, and S6 to select different working modes. When the time code input mode is selected, the button S1 is clicked to determine that the single audio interface switching device enters the time code input mode; at this time, the driver chip 50 issues instructions, and the pins EN1, EN2, and EN4 in the driver chip 50 output low levels. When pins EN1, EN2, EN4 are in the low-level state, signals of the pins S in the first analog switch (U1), the second analog switch (U2), and the fourth analog switch (U4) are at a low level. The pin A and the pin B0 are connected with each other in the first analog switch (U1), the second analog switch (U2), and the fourth analog switch (U4), the pin B0 is connected to the ground in the first analog switch (U1), the second analog switch (U2), and the fourth analog switch (U4), and the pin B1 and the pin A are disconnected in the first analog switch (U1), the second analog switch (U2) and the fourth analog switch (U4), so that audio signal output and time code signal output cannot be performed.

Meanwhile, the pin EN3 outputs a high-level signal and is connected with the pin S of the third analog switch (U3) by wire. After a high level is input to the pin S of the third analog switch (U3), the pin A is connected with the pin B1, and the pin B1 is connected with the left channel (L) of the single audio receptacle 10. A device capable of generating time code signals externally inputs time code signals through the left channel (L) of the audio receptacle, and the time code signals are sent to the time code input interface in the driver chip 50 after passing through the third analog switch (U3) so as to be input into the driver chip 50 for analysis, and after the analysis is finished, a synchronized time code is displayed on the display screen, thereby realizing a state corresponding to mode 3 of the time code signal input.

When time code output mode is selected, and the button S1 is clicked to confirm that the single audio interface switching device enters the time code output mode, the driver chip 50 issues instructions so that the pins EN1, EN2, EN3 of the driver chip 50 output low levels. When the pins EN1, EN2, and EN3 are in a low-level state, the pins S in the first analog switch (U1), the second analog switch (U2), and the third analog switch (U3) are the low-level signals. The pin A and the pin B0 are connected in the first analog switch (U1), the second analog switch (U2), and the third analog switch (U3). Because the pins B0 of the first analog switch (U1), the second analog switch (U2), and the third analog switch (U3) are connected to the ground, and the pins B1 and the pins A are disconnected in the first analog switch (U1), the second analog switch (U2), and the third analog switch (U3), so that audio signal output and time code signal input cannot be performed.

Meanwhile, in the time code output mode, the pin EN4 in the driver chip 50 outputs a high level, and the pin EN4 is connected to the pin S in the fourth analog switch (U4) by a wire. After the pin S in the fourth analog switch (U4) receives a high level, the pin A is connected to the pin B1, and the pin B1 is connected to the left channel (L) of the single audio receptacle 10. The time code output interface of the driver chip 50 outputs the time code signal, which passes through a wire of the fourth analog switch (U4) to the left channel (L) in the single audio receptacle 10 for output. The time code signal is output to an equipment that can recognize the time code signal, and a state corresponding to mode 4 of the time code output is realized.

It should be noted that, in the embodiments of the present disclosure, the single audio interface signal switching circuit further includes other structures such as resistors and capacitors, which may specifically refer to the figures provided in the embodiments of the present disclosure and are not described here for brevity.

In the above embodiments, the single audio interface signal switching circuit further includes an audio signal input module. Please refer to FIG. 8, in which the audio codec further includes a microphone input interface (MICIN), which is electrically connected to the pin 2 of the single audio receptacle 10. The pin 2 corresponds to a pull-up resistor R6. Since impedance of the microphone is usually between 600 ohms and 2200 ohms, a size of the pull-up resistor R6 can be set to 2200 ohms. Meanwhile, the pull-up resistor R6 is electrically connected to a power supply VCC.

In the above embodiments, magnitude of voltage at two ends of the pin 2 can be determined by using a resistor R7 shown in FIG. 8, in which one end of the resistor R7 is electrically connected to an ADC interface in the driver chip 50, and another end thereof is connected in series with the resistor R6. If it is detected that the voltage at two ends of the pin 2 is between 0.23 VCC-0.5 VCC, it can be considered that a microphone is connected at this time, and thus a microphone icon is displayed on the display screen. The external audio signal can be input through the microphone input interface.

The embodiment of the present disclosure also provides a single audio interface switching device, which may include the single audio interface signal switching circuit as described in any one of the above, and also includes display screen to display time codes.

In some embodiments of the present disclosure, a single audio interface signal switching circuit in the single audio interface switching device includes:
  a single audio receptacle;
  an audio signal output module, one end of the audio signal output module electrically connected to the single audio receptacle;
  a time code input module, one end of the time code input module electrically connected to the single audio receptacle;
  a time code output module, one end of the time code input module electrically connected to the single audio receptacle;
  a driver chip, the driver chip including a plurality of pins, wherein another ends of the audio signal output module, the time code input module, and the time code output module are electrically connected with different pins of the driver chip, respectively;
  a working mode switching module, the working mode switching module electrically connected to one of the pins of the driver chip;
  wherein, the working mode switching module is used to control the driver chip to generate a drive signal to control working states of the audio signal output module, the time code input module, and the time code output module.

The single audio interface switching device provided by the embodiments of the present disclosure sets only one single audio interface, uses the working mode switching module to control the driver chip to generate different drive signals, in order to control the working states of the audio signal output module, the time code input module, and the time code output module electrically connected with the driver chip. Since there is only one audio interface, and the working mode of the single audio interface switching device is controlled by the working mode switching module, the volume of the single audio interface switching device is reduced.

It should be noted that the driver chip 50 including a plurality of pins, and the driver chip 50 is electrically connected to other modules through the plurality of pins. Specifically, another end of the audio signal output module is electrically connected with one of the plurality of pins of the driver chip, another end of the time code input module is electrically connected with one of the plurality of pins of the driver chip, and another end of the time code input module is electrically connected with one of the plurality of pins of the driver chip. In the embodiments of the present disclosure, the pins of the driver chip 50 electrically connected to the audio signal output module 20, the time code input module 30, the time code output module 40, and the operating mode switching module 60 are different.

In other embodiments of the present disclosure, the single audio receptacle 10 includes multiple sets of switches, the multiple sets of switches correspond to multiple audio receptacle pins, and the multiple audio receptacle pins are electrically connected to the audio signal output module, the time code input module, and the time code output module, respectively.

In the above embodiments, description of each embodiment has its own emphasis. For the parts that are not described in detail in a certain embodiment, one may refer to the detailed descriptions of other embodiments, which will not be described herein again.

In the specific implementation, each of the above units or structures can be implemented as an independent entity, or can be combined arbitrarily to be implemented as same or several entities. For the specific implementation of each of the above units or structures, one may refer to the previous method embodiments, which will not be described herein again.

The single audio interface signal switching circuit and the single audio interface switching device provided by the embodiments of the present disclosure are described in detail above. Specific examples are used in this document to illustrate the principles and embodiments of the present disclosure. The description of the above embodiments is only used to help understand the method and the core idea of the present disclosure; at the same time, those skilled in the art can obtain, according to the idea of the present disclosure, variations in the specific embodiments and the scope of application, and thus, the content of the present specification should not be construed as limitation to the present disclosure.

What is claimed is:

1. A single audio interface signal switching circuit, comprising:
   a single audio receptacle;
   an audio signal output module, one end of the audio signal output module electrically connected to the single audio receptacle;
   a time code input module, one end of the time code input module electrically connected to the single audio receptacle;
   a time code output module, one end of the time code output module electrically connected to the single audio receptacle;
   a driver chip, the driver chip including a plurality of pins, wherein another ends of the audio signal output module, the time code input module, and the time code output module are respectively electrically connected with each different pin of the driver chip; and
   a working mode switching module, the working mode switching module electrically connected to one pin of the driver chip;
   wherein the working mode switching module is used to control the driver chip to generate a drive signal to control working states of the audio signal output module, the time code input module, and the time code output module.

2. The single audio interface signal switching circuit according to claim 1, wherein the single audio receptacle includes multiple sets of switches, the multiple sets of switches correspond to multiple audio receptacle pins, the multiple audio receptacle pins are electrically connected to the audio signal output module, the time code input module, and the time code output module, respectively.

3. The single audio interface signal switching circuit according to claim 1, wherein the audio signal output module comprises a first analog switch (U1) and a second analog switch (U2), wherein circuit structures of the first analog switch (U1) and the second analog switch (U2) are same.

4. The single audio interface signal switching circuit according to claim 3, wherein both the first analog switch (U1) and the second analog switch (U2) include a pin A, a pin B1, and a pin B0; the pin A, the pin B1, and the pin B0 form a single-pole double-throw switch; the pin A in the first analog switch (U1) is electrically connected to an audio receptacle pin in the single audio receptacle, and corresponds to a left channel (L) in the single audio receptacle; and the pin A in the second analog switch (U2) is electrically connected to an audio receptacle pin in the single audio receptacle and corresponds to a right channel (R) in the single audio receptacle.

5. The single audio interface signal switching circuit according to claim 3, wherein the single audio interface signal switching circuit further includes an audio codec module, which includes a pin 1 and a pin 2, wherein the audio codec module is electrically connected to the first analog switch (U1) via the pin 1 and the audio codec module is electrically connected to the second analog switch (U2) via the pin 2.

6. The single audio interface signal switching circuit according to claim 1, wherein the time code input module includes a third analog switch (U3), the third analog switch (U3) comprises a pin A, and the third analog switch (U3) is electrically connected to the driver chip through the pin A.

7. The single audio interface signal switching circuit according to claim 6, wherein the time code output module comprises a fourth analog switch (U4), the circuit structures of the fourth analog switch (U4) and the third analog switch (U3) are same; the fourth analog switch (U4) comprises a pin A, and the fourth analog switch (U4) is electrically connected with the driver chip through the pin A.

8. The single audio interface signal switching circuit according to claim 1, wherein the driver chip includes a pin EN1, a pin EN2, a pin EN3, and a pin EN4, the audio signal output module is electrically connected with the driver chip through the pin EN1 and the pin EN2, the time code input module is electrically connected with the driver chip through the pin EN3, and the time code output module is electrically connected with the driver chip through the pin EN4.

9. The single audio interface signal switching circuit according to claim 8, wherein the driver chip further includes a pin DET, the single audio receptacle is electrically connected to the pin DET to detect whether an earphone is inserted.

10. The single audio interface signal switching circuit according to claim 8, wherein the working mode switching module includes a plurality of switch buttons for controlling level signals output by the pin EN1, the pin EN2, the pin EN3, and the pin EN4.

11. A single audio interface signal switching device, wherein the single audio interface signal switching device includes a single audio interface signal switching circuit, and the single audio interface signal switching circuit comprises:
- a single audio receptacle;
- an audio signal output module, one end of the audio signal output module electrically connected to the single audio receptacle;
- a time code input module, one end of the time code input module electrically connected to the single audio receptacle;
- a time code output module, one end of the time code output module electrically connected to the single audio receptacle;
- a driver chip, the driver chip including a plurality of pins, wherein another ends of the audio signal output module, the time code input module, and the time code output module are respectively electrically connected with each different pin of the driver chip; and
- a working mode switching module, the working mode switching module electrically connected to one pin of the driver chip;
- wherein the working mode switching module is used to control the driver chip to generate a drive signal to control working states of the audio signal output module, the time code input module, and the time code output module.

12. The single audio interface signal switching device according to claim 11, wherein the single audio receptacle includes multiple sets of switches, the multiple sets of switches correspond to multiple audio receptacle pins, the multiple audio receptacle pins are electrically connected to the audio signal output module, the time code input module, and the time code output module, respectively.

13. The single audio interface signal switching device according to claim 11, wherein the audio signal output module comprises a first analog switch (U1) and a second analog switch (U2), and circuit structures of the first analog switch (U1) and the second analog switch (U2) are same.

14. The single audio interface signal switching device according to claim 13, wherein both the first analog switch (U1) and the second analog switch (U2) include a pin A, a pin B1, and a pin B0; wherein the pin A, the pin B1 and the pin B0 form a single-pole double-throw switch; the pin A in the first analog switch (U1) is electrically connected to an audio receptacle pin in the single audio receptacle, and corresponds to a left channel (L) in the single audio receptacle; and the pin A in the second analog switch (U2) is electrically connected to the audio receptacle pin in the single audio receptacle, and corresponds to a right channel (R) in the single audio receptacle.

15. The single audio interface signal switching device according to claim 13, wherein the single audio interface signal switching circuit further includes an audio codec module, which includes pin 1 and pin 2, wherein the audio codec module is electrically connected to the first analog switch (U1) via the pin 1 and the audio codec module is electrically connected to the second analog switch (U2) via the pin 2.

16. The single audio interface signal switching device according to claim 11, wherein the time code input module includes a third analog switch (U3), the third analog switch (U3) comprises a pin A, the third analog switch (U3) is electrically connected to the driver chip through the pin A.

17. The single audio interface signal switching device according to claim 16, wherein the time code output module comprises a fourth analog switch (U4), the circuit structures of the fourth analog switch (U4) and the third analog switch (U3) are same, the fourth analog switch (U4) comprises a pin A, and the fourth analog switch (U4) is electrically connected with the driver chip through the pin A.

18. The single audio interface signal switching device according to claim 11, wherein the driver chip includes a pin EN1, a pin EN2, a pin EN3, and a pin EN4, the audio signal output module is electrically connected with the driver chip through the pin EN1 and the pin EN2, the time code input module is electrically connected with the driver chip through the pin EN3, and the time code output module is electrically connected with the driver chip through the pin EN4.

19. The single audio interface signal switching device according to claim 18, wherein the driver chip further includes a pin DET, the single audio receptacle is electrically connected to the pin DET to detect whether an earphone is inserted.

20. The single audio interface signal switching device according to claim 18, wherein the working mode switching module includes a plurality of switch buttons for controlling level signals output by the pin EN1, the pin EN2, the pin EN3, and the pin EN4.

* * * * *